(12) United States Patent
Lorthioir

(10) Patent No.: US 8,235,245 B2
(45) Date of Patent: Aug. 7, 2012

(54) DETACHABLE GRIP DEVICE HAVING ACTIVATION BUTTONS FOR OPENING JAW-FORMING ELEMENTS

(75) Inventor: Christophe Lorthioir, Bloye (FR)

(73) Assignee: SEB SA, Ecully (FR)

( * ) Notice: Subject to any disclaimer, the term of this patent is extended or adjusted under 35 U.S.C. 154(b) by 776 days.

(21) Appl. No.: 12/281,779

(22) PCT Filed: Feb. 22, 2007

(86) PCT No.: PCT/FR2007/000324
§ 371 (c)(1),
(2), (4) Date: Oct. 27, 2008

(87) PCT Pub. No.: WO2007/101924
PCT Pub. Date: Sep. 13, 2007

(65) Prior Publication Data
US 2009/0039096 A1  Feb. 12, 2009

(30) Foreign Application Priority Data
Mar. 6, 2006 (FR) ..................................... 06 01988

(51) Int. Cl.
*B65D 25/28* (2006.01)
*A47J 45/07* (2006.01)
*A47J 45/10* (2006.01)
(52) U.S. Cl. ....... 220/759; 220/762; 220/763; 294/27.1; 294/28; 294/31.1
(58) Field of Classification Search .................. 220/759, 220/762–764; 294/27.1–34
See application file for complete search history.

(56) References Cited

U.S. PATENT DOCUMENTS

| 1,406,826 A | * | 2/1922 | Dugger | 220/759 |
| 1,635,119 A | | 7/1927 | Dziuba et al. | |
| 2,712,151 A | * | 7/1955 | Becht | 220/759 |
| 3,065,016 A | * | 11/1962 | Serio | 294/31.1 |
| 3,065,017 A | * | 11/1962 | Serio | 294/31.1 |
| 3,065,018 A | * | 11/1962 | Serio | 294/31.1 |
| 3,108,316 A | * | 10/1963 | Peale | 220/759 |
| 3,157,909 A | * | 11/1964 | Schmitt | 220/759 |
| 3,186,026 A | * | 6/1965 | Serio | 220/759 |
| 3,306,648 A | * | 2/1967 | Serio | 294/27.1 |
| 3,438,082 A | * | 4/1969 | Jones et al. | 220/759 |
| 3,474,486 A | * | 10/1969 | Serio et al. | 220/759 |

(Continued)

FOREIGN PATENT DOCUMENTS
EP  0906742 A1  4/1999
(Continued)

*Primary Examiner* — J. Gregory Pickett
*Assistant Examiner* — Ned A Walker
(74) *Attorney, Agent, or Firm* — Bachman & LaPointe, P.C.

(57) ABSTRACT

A detachable grip device has a body, two jaw-forming elements which are mobile in relation to each other between an open position and a closed position, a system for displacing the jaw-forming elements which are designed in such a way as to be able to alternate between a stable closing state and a stable opening state, via an intermediate state of unstable equilibrium, and a system for opening the jaw-forming elements. The opening system is adapted in such a way as to drive the displacement system initially in their closed state past the intermediate state of unstable equilibrium. The opening system comprises at least one button which is arranged on a longitudinal side of the body and is mounted in a sliding manner according to a direction of displacement having a component in the transverse direction.

8 Claims, 3 Drawing Sheets

U.S. PATENT DOCUMENTS

| | | | | |
|---|---|---|---|---|
| 4,512,495 A * | 4/1985 | Bauer et al. | | 220/316 |
| 4,577,367 A * | 3/1986 | Durand | | 220/759 |
| 5,704,092 A | 1/1998 | Nicollet et al. | | |
| 6,000,100 A * | 12/1999 | Montgelard | | 16/425 |
| 6,257,439 B1 * | 7/2001 | Hsu | | 220/759 |
| 6,318,776 B1 * | 11/2001 | Lee | | 294/34 |
| 6,393,973 B1 * | 5/2002 | Velo et al. | | 99/422 |
| 6,439,420 B1 * | 8/2002 | Park | | 220/759 |
| 6,694,868 B1 * | 2/2004 | Hung | | 99/403 |
| 6,708,373 B2 * | 3/2004 | Dodane | | 16/425 |
| 7,478,735 B2 * | 1/2009 | Lorthioir et al. | | 220/759 |
| 7,481,330 B2 * | 1/2009 | Lorthioir et al. | | 220/759 |
| 7,611,179 B2 * | 11/2009 | Lorthioir et al. | | 294/34 |
| 2006/0006186 A1 * | 1/2006 | Lorthioir et al. | | 220/759 |
| 2006/0081136 A1 * | 4/2006 | Lorthioir et al. | | 99/584 |
| 2006/0096996 A1 * | 5/2006 | Lorthioir et al. | | 220/759 |

FOREIGN PATENT DOCUMENTS

| | | |
|---|---|---|
| FR | 2739772 A1 | 4/1997 |
| SU | 1063385 A1 | 12/1983 |

\* cited by examiner

DETACHABLE GRIP DEVICE HAVING ACTIVATION BUTTONS FOR OPENING JAW-FORMING ELEMENTS

BACKGROUND OF THE INVENTION

This invention relates to a detachable grip device for a kitchen accessory, for example a detachable holder for a pan.

A detachable grip device is known of the type which comprises a grip body, wherein two elements forming jaws that are mobile in translation with respect to one another according to a longitudinal direction between an open position and a closed position in which they are able to clamp the skirt of a kitchen accessory, wherein means of moving the jaw-forming elements configured so as to pass from a stable closed state in which the two jaw-forming elements are in their closed position to a stable open state in which the two jaw-forming elements are in their open position, and inversely, passing via an intermediate unstable equilibrium state, and means of opening the jaw-forming elements movable between a rest position in which they have no effect on the movement means, and an activation position in which they are adapted to drive the movement means initially in their closed state beyond their unstable intermediate state.

Such a device is for example described in the patent application FR 2 842 717 wherein the opening means are formed by a manual control button that is mounted in translation according to the longitudinal direction, on the upper face of the grip body so that in a natural position, the hand holding the handle has the thumb on the button. Furthermore, for safety reasons (in order to avoid involuntarily moving the button from its rest position to its activation position), the movement of the button is orientated as follows: the button in the rest position is closer to the longitudinal end in contact with the kitchen accessory than when it is in the activation position. Consequently, to drive the button to the activation position, the thumb must be bent, which is not a movement that is made involuntarily.

The problem of this grip device is that the orientation of the movement of the opening means is so unnatural that it has proven to be impractical, especially due to the fact that the means for moving the jaw-forming elements comprise a lever that has a pivoting mounting on the lower face of the grip body, and that, to actuate the opening of the jaw-forming elements, not only does the button located on the upper face have to be pulled, but also the lever located on the lower face has to be freed to permit the deployment.

SUMMARY OF THE INVENTION

This invention aims to create a detachable grip device of the above-mentioned type whose opening means are conformed so that they may not be moved to their activation position involuntarily but without their voluntary movement being awkward.

According to the invention, in the detachable grip device of the above-mentioned type, the opening means comprise at least one button that is located on a longitudinal side of the grip body, and that is mounted so that it slides according to a direction of movement with a component in the transversal direction.

Consequently, due to this lateral disposition, neither the thumb which rests naturally on the upper face of the grip body, or the other fingers which naturally surround the body on a lateral face and the lower face, can accidentally actuate the manual control button. However, due to its lateral disposition, the index finger simply needs to be moved (unfolded) so that it reaches the manual control button.

BRIEF DESCRIPTION OF THE DRAWINGS

Other specific features and advantages will become clear in the following description of the embodiment provided by way of non-restrictive example and illustrated in the appended drawings in which.

DETAILED DESCRIPTION OF THE PREFERRED EMBODIMENT(S)

Figure 1:
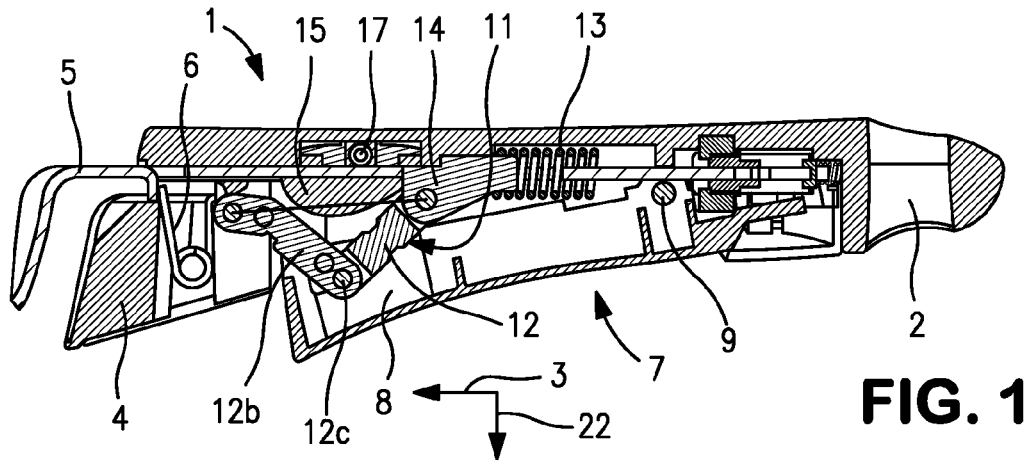
FIG. 1 is a longitudinal cross section of a detachable grip device according to a first embodiment, wherein the jaw-forming elements are in the open position and the movement means are in their open state.
Figure 2:
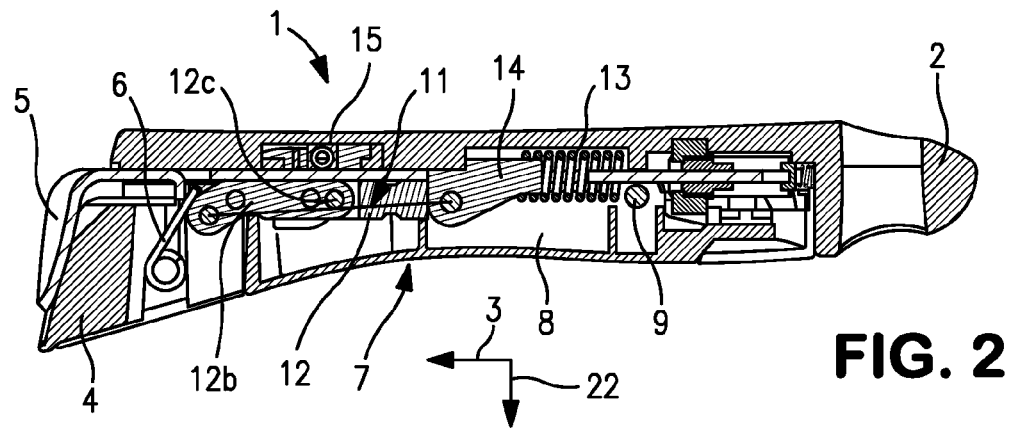
FIG. 2 is a similar view to FIG. 1, wherein the forming elements are in the closed position and the movement means are in their closed state.
Figure 3:
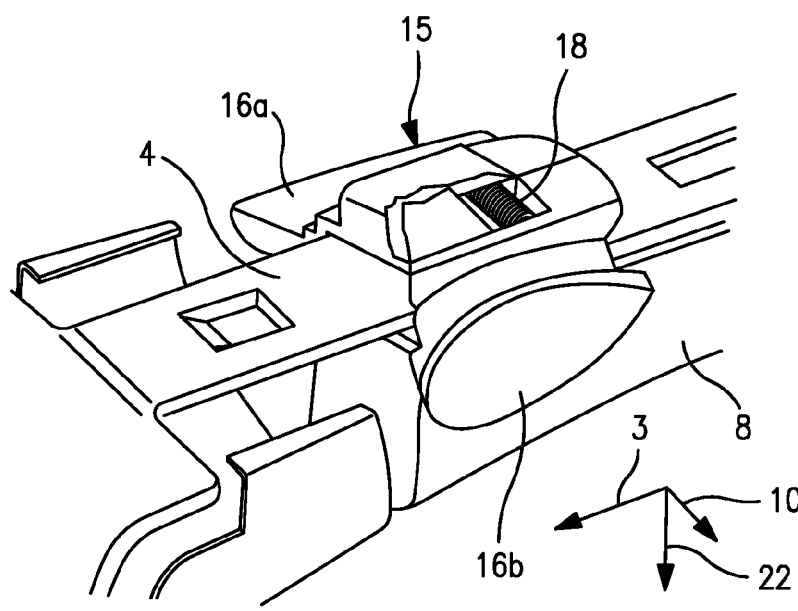
FIG. 3 is a perspective view of the front section of the datable grip device.

As may be seen in FIGS. 1 and 2, a detachable grip device 1 for a kitchen accessory comprises a grip body 2 which mainly extends according to a longitudinal direction 3. When the grip device 1 is attached to a position of the lateral wall of a kitchen accessory, the longitudinal direction 3 is generally perpendicular to this lateral portion.

The detachable grip device 1 also comprises two jaw-forming elements 4, 5 that are mobile with respect to one another (here in translation according to the longitudinal direction 3) between an open position and a closed position in which they are able to clamp the skirt of the kitchen accessory. In this embodiment, one 4 of the two jaw-forming elements has a fixed mounting on the grip body 2 (and more precisely on a first longitudinal end of this body so that it may come into contact with the outside surface of the kitchen accessory), wherein the other 5 has a mobile mounting on the body 2. Furthermore, the mobile jaw-forming element 5 is solicited in its open position by a spring 6.

Moreover, in order to permit the movement of the jaw-forming elements 4, 5, the detachable grip device comprises movement means 7. These movement means 7 are configured so that they may pass from a stable closed state in which the two jaw-forming elements 4, 5 are in their closed position, to a stable open state in which the two jaw-forming elements 4, 5 are in their open position, and inversely, passing via an intermediate unstable equilibrium state. Consequently, in this embodiment, the two jaw-forming elements 4, 5 naturally remain in their closed position, without the user needing to exert any effort whatsoever on the detachable grip device 1. In this example, the movement means 7 comprise a lever 8 that has a pivoting mounting on the grip body 2 according to a pivot axis 9 which extends according to a transversal direction 10 perpendicular to the longitudinal direction 3, and transmission means 11 which permit the movement of the jaw-forming elements 4, 5 when the lever 8 is pivoted. In this case, the transmission means 11 comprise two connecting rods 12, 12b.

The lever 8 is positioned on the lower face of the grip body and is mobile between a retracted position and a deployed position, passing via an intermediate unstable equilibrium position, wherein the positions respectively correspond to the closed, open and unstable equilibrium states of the movement means 7. Furthermore, the movement means 7 also comprise a spring 13 that is located between the mobile jaw-forming element 5 and an element 14 (that is also part of the transmission means 11) that is articulated on the first connecting rod 12 and that is mounted in translation according to the longitudinal direction 3 in the grip body 2. This spring 13 permits the distance separating the two jaw-forming elements 4, 5 in the closed position to be adjusted to suit the thickness of the lateral wall of the kitchen accessory clamped. The second connecting rod 12b has a pivoting mounting, on its first end, to the grip body 2, and by its second end to the first connecting rod 12 according to an axis 12c that is mounted so that it slides in a groove in the lever 8.

Moreover, the detachable grip device 1 comprises opening means 15 that permit the jaw-forming elements 4, 5 to be moved from their stable closed position to their open position. The opening means 15 are mobile between a rest position in which they have no effect on the movement means 7, and an activation position in which they are adapted to drive the movement means 7 initially in their closed state beyond their intermediate unstable equilibrium state, so that once this state has been passed through, the movement means 7 naturally pass to their stable open state (and the jaw-forming elements 4, 5 naturally pass to their open position) especially due to the action of the spring 6 which drives the mobile jaw-forming element 5 and therefore the element 14 (via the spring 13), the two connecting rods 12, 12b and the lever 8.

The opening means 15 comprise at least one button 16a, 16b that is positioned on a longitudinal side of the grip body 2, and that is mounted so that it slides according to a direction with a component in the transversal direction 10. In this embodiment, the opening means 15 are formed by two buttons 16a, 16b, wherein each button 16a, 16b is positioned on a longitudinal side of the grip body 2 that is specific to it. The two buttons 16a, 16b have a mounting that is mobile in translation in a cavity 17 in the grip body 2, above the housing of the lever 8. Furthermore, the opening means 15 are solicited in their rest position by a spring 18 which, in this case, is located in the cavity 17 between the two buttons 16a, 16b and comes into contact with the latter so as to move them apart from one another, and so that in their rest position the two buttons 16a, 16b protrude from the grip body 2 through an opening 19 that opens out into the cavity 17.

Figure 6:
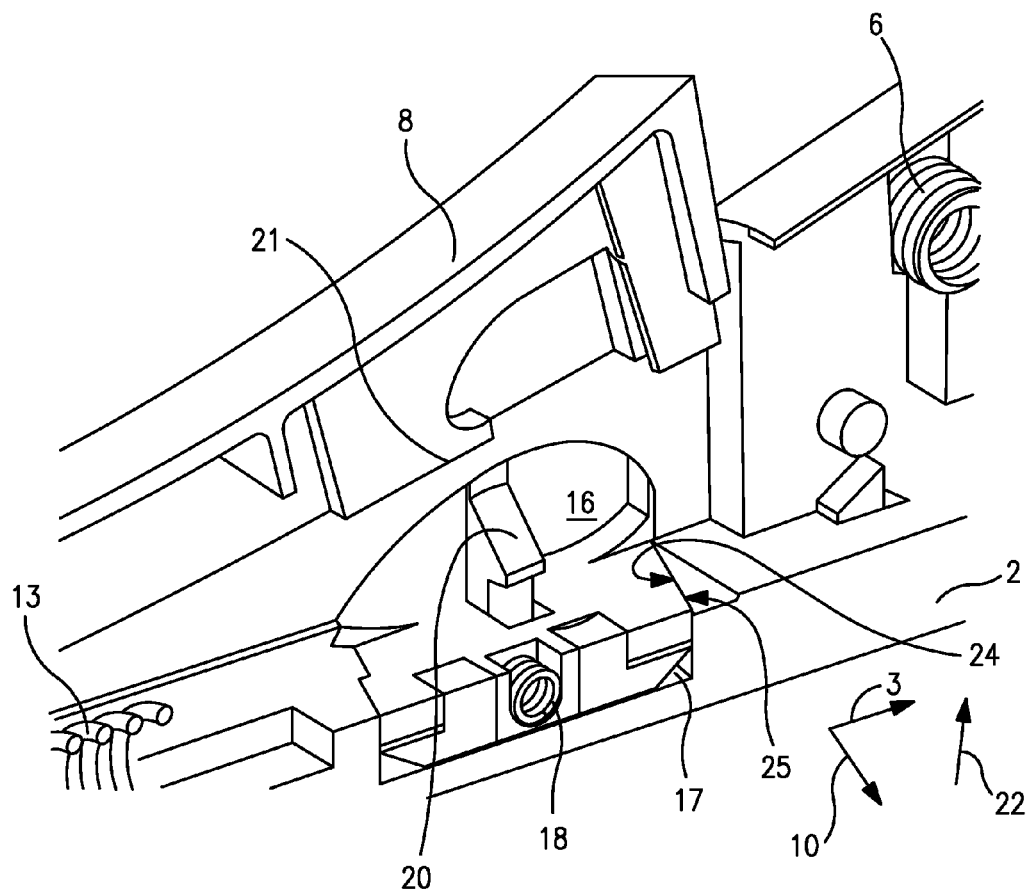
FIG. 6 is a cross sectional view of part of the detachable grip device illustrating the interaction between the opening means and the movement means.

In this embodiment, the interaction between the movement means 7 and the opening means 14 that are positioned above the movement means 7 is achieved by means of a drive surface 20 that is borne by the opening means 15 (in this case, a drive surface 20 is borne by each button 16a, 16b) and which, when the opening means 15 are moved from their rest position to their activation position, can come into contact against an accommodation surface 21 on the movement means 7 (in this case by the lever 8) and to move this accommodation surface 21 so as to drive the movement means 7 (the lever 8, and, by means of the axis 12c, the two connecting rods 12, 12b as well as the element 14) to their open state (in the deployed position) and the mobile jaw-forming element 5 to its open position. As may be seen in FIG. 6, for each button 16a, 16b, the drive surface 20 is angled in the transversal 10 and vertical 22 directions so that when the button 16a, 16b is driven in its activation position by movement in the transversal direction 10, initially, wherein the distance between drive surface 20 and the accommodation surface 21 diminishes until contact occurs, and subsequently the lever 8 (by the accommodation surface 20) is driven so that it pivots until it crosses its intermediate unstable equilibrium position.

Moreover, in order to improve the safety of the detachable grip device 1, the cavity 17 and the two buttons 16a, 16b are configured and laid out so that the two buttons 16a, 16b cannot be moved to their activation position unless they are driven simultaneously. Consequently, if, in spite of the safety provided by the specific position of the buttons 16a, 16b on the grip body 2, following the detachable grip device 1 hitting another element, one of the two buttons 16a, 16b is hit so that it is moved towards its activation position, this position will not be reached as the other button 16a, 16b has not also been driven towards its activation position.

In this embodiment, this function is due to the fact that the cavity 17 and the two buttons 16a, 16b are configured so that the buttons 16a, 16b are mounted so that they are mobile in translation according to a direction of movement 23 with a transversal component 10 which permits the activation of the movement means 7, and a longitudinal component 3 which permits the movement of a button 16a to be blocked if the other button 16b is not also moved.

Figure 4:
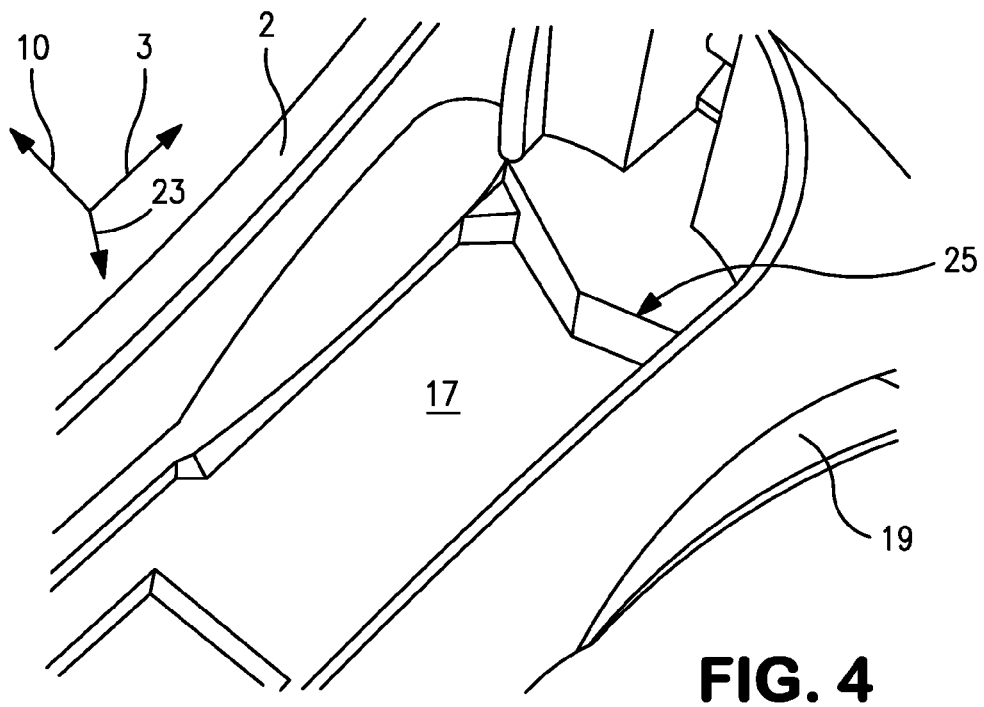
FIG. 4 is a top view of the cavity in the grip body that is adapted to accommodate the opening means.
Figure 5:
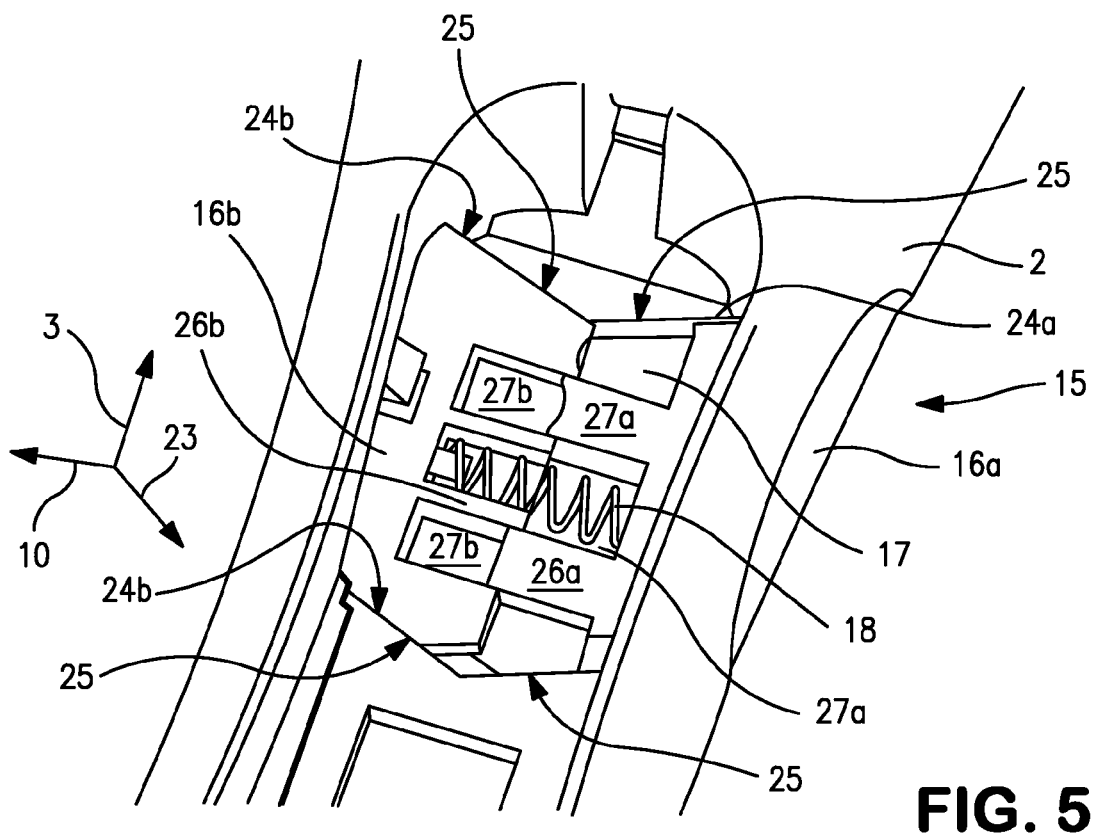
FIG. 5 is a similar view to FIG. 4, wherein the cavity contains the opening means in the rest position.

More precisely, as may be seen in FIGS. 4 and 5, each button 16a, 16b comprises a guide surface 24a, 24b which extends according to the direction of movement 23 and that can slide along a guide ramp 25 in the cavity 17 and parallel to the corresponding guide surface 24a, 24b. Consequently, when a button 16a is driven in the transversal direction 10, it is also moved in the longitudinal direction 3. In complement to this, at least one of the buttons 16a comprises a bracket 26a which extends according to the transversal direction 10 in the direction of the other button 16b, wherein this other button 16b comprises a housing 27b which accommodates at least partially the bracket 26a of the first button 16a regardless of the position of the two buttons 16a, 16b. In this case, each button 16a, 16b is conformed so that it comprises at least one bracket 26a, 26b and at least one housing 27a, 27b. In order to block the buttons 16a, 16b when they are moved unitarily, the dimensions in the longitudinal direction 3 of the housing 27a and the bracket 26b accommodated in this housing 27a are such that, when a single button 16a is moved, the bracket 26b and the housing 27a that is associated to it come into contact with one another due to their relative longitudinal movement. Due to this contact, the fixed button 16b immobilises the button 16a moved before the latter reached the position in which it drove the movement means 7 to their open state by passing through their intermediate unstable equilibrium state. In this case, to ensure maximum safety, the dimensions in the longitudinal direction 3 of each bracket 26a, 26b and each associated housing 27a, 27b are substantially identical so that the two buttons 16a, 16b may only be moved simultaneously.

The invention claimed is:

1. A detachable grip device comprising a grip body including two elements forming jaws that are mobile in translation with respect to one another according to a longitudinal direction between an open position and a closed position in which the jaws are able to clamp a skirt of a kitchen accessory, said longitudinal direction being perpendicular to a vertical direction, means for moving the jaw-forming elements from a stable closed state in which the two jaw-forming elements are in the closed position and a stable open state in which the two jaw-forming elements are in the open position, and inversely, passing via an intermediate unstable equilibrium state, and means for opening the, jaw-forming elements between a rest position in which the opening means have no effect on the movement means, and an activation position in which the opening means are adapted to drive the movement means initially in the closed state beyond the intermediate unstable equilibrium state, and the means for opening comprising at least one button that is located on a longitudinal side of the grip body and that is mounted as to slide according to a direction of movement having a component in a transverse direction that is perpendicular to the longitudinal direction, wherein the means for moving comprise a lever that is mobile in a pivot axis which extends according to the transverse direction between a retracted position and a deployed position, passing via an intermediate unstable equilibrium position, wherein said retracted, deployed and intermediate unstable equilibrium positions respectively correspond to the closed, open and unstable equilibrium states of the means for moving, and wherein the means for opening comprise two buttons which are mounted as to slide in a cavity in the grip body and wherein each said button is positioned on said longitudinal side of the grip body that is specific to said button.

2. The detachable grip device of claim 1, wherein the means for opening comprise a drive surface which, when the opening means are moved from the rest position to the activation position, can come into contact against an accommodation surface on the means for moving and to move said accommodation surface so as to drive the means for moving to the open state.

3. The detachable grip device of claim 2, wherein the accommodation surface is borne by a lever.

4. The detachable grip device of claim 1, wherein the cavity and the two buttons are configured and laid out so that the two buttons cannot be moved to their activation position unless the buttons are driven simultaneously.

5. The detachable grip device of claim 4, wherein the cavity and the two buttons are configured and laid out so that the direction of movement of each said button has a longitudinal component which permits the movement of a respective button to be blocked if the other button is not also moved.

6. The detachable grip device of claim 5, wherein each said button comprises a guide surface which extends according to the direction of movement and that can slide along a corresponding guide ramp in the cavity that is parallel to said guide surface.

7. The detachable grip device of claim 6, wherein said device has a plurality of buttons, at least a first one of the buttons comprises a bracket which extends according to the transverse direction in the direction of a second one of the buttons which comprises a housing which accommodates at least partially the bracket of the first button regardless of the position of the first and second buttons, wherein dimensions in the longitudinal direction of the housing and the bracket accommodated in the housing are such that, when the first button is moved, the bracket and the corresponding housing come into contact with one another due to the relative longitudinal movement before the means for moving are driven to the open state by passing through the unstable intermediate state.

8. The detachable grip device of claim 7, wherein the dimensions in the longitudinal direction of the bracket and the housing which accommodates the bracket are substantially identical so that the two buttons may only be moved simultaneously.

* * * * *